United States Patent
Li et al.

(10) Patent No.: US 10,411,485 B2
(45) Date of Patent: Sep. 10, 2019

(54) BATTERY PROTECTION SYSTEM AND METHOD

(71) Applicant: Bose Corporation, Framingham, MA (US)

(72) Inventors: Xin Li, Wellesley, MA (US); Christopher Barnes, Lynnfield, MA (US)

(73) Assignee: Bose Corporation, Framingham, MA (US)

( * ) Notice: Subject to any disclaimer, the term of this patent is extended or adjusted under 35 U.S.C. 154(b) by 45 days.

(21) Appl. No.: 15/783,093

(22) Filed: Oct. 13, 2017

(65) Prior Publication Data
US 2019/0115774 A1   Apr. 18, 2019

(51) Int. Cl.
*H02J 7/00* (2006.01)
*H02H 7/18* (2006.01)

(52) U.S. Cl.
CPC ............ *H02J 7/0031* (2013.01); *H02H 7/18* (2013.01); *H02J 7/00* (2013.01); *H02J 2007/004* (2013.01)

(58) Field of Classification Search
CPC .. H02H 7/18; H02J 2007/0067; H02J 7/0031; H02J 7/0063; H02J 7/008; H02J 2007/004; H02J 7/00
See application file for complete search history.

(56) References Cited

U.S. PATENT DOCUMENTS

| | | | |
|---|---|---|---|
| 6,137,265 A | 10/2000 | Cummings et al. | |
| 6,271,605 B1* | 8/2001 | Carkner | H02J 7/0031 307/125 |
| 2013/0038295 A1 | 2/2013 | Kao et al. | |
| 2015/0229147 A1* | 8/2015 | Altemose | H02J 7/0026 361/90 |
| 2016/0056623 A1* | 2/2016 | Henry | H02J 7/0044 320/114 |
| 2016/0344206 A1 | 11/2016 | Ono | |
| 2017/0244239 A1* | 8/2017 | Jin | H02H 7/18 |

OTHER PUBLICATIONS

International Search Report and the Written Opinion of the International Searching Authority, International Application No. PCT/US2018/054948, pp. 1-10, dated Feb. 11, 2019.

* cited by examiner

*Primary Examiner* — Vuthe Siek
(74) *Attorney, Agent, or Firm* — Bond, Schoeneck & King, PLLC

(57) ABSTRACT

A battery protection system, comprising: a first protection circuit configured to detect a battery output voltage value and to disconnect the battery output from a load when the output voltage falls below a first threshold; a second protection circuit configured to detect the battery output voltage value and to disconnect the battery output from the load when the output voltage falls below a second threshold, wherein the first threshold is within a tenth of a volt of the second threshold.

18 Claims, 3 Drawing Sheets

BATTERY PROTECTION SYSTEM AND METHOD

BACKGROUND

This disclosure relates to battery protection systems and methods.

SUMMARY

All examples and features mentioned below can be combined in any technically possible way.

In one aspect, a battery protection system includes a first protection circuit configured to detect a value of a battery output voltage and to disconnect an output of the battery from a load when the value of the battery output voltage reaches or falls below a first threshold; and a second protection circuit configured to detect the value of the battery output voltage and to disconnect the battery output from the load when the value of the battery output voltage reaches or falls below a second threshold, wherein the first threshold is substantially equal to the second threshold.

Embodiments may include one of the following features, or any combination thereof. The first threshold may be within a first range defined by a first tolerance, wherein the second threshold may be within a second range defined by a second tolerance, wherein an upper bound of the first range may be within a tenth of a volt of a lower bound of the second range. The first range and the second range may overlap. The first range may overlap a major portion of the second range. The first range and the second range may be coextensive. The first threshold and the second threshold may each be below 3.1 V.

Embodiments may include one of the following features, or any combination thereof. The second protection circuit may be disposed between the first protection circuit and the battery, such that the first protection circuit is disconnected from the battery when the value of the battery output voltage falls below the second threshold. The second threshold may be higher than the first threshold.

In another aspect, a battery protection system may comprise a first protection circuit configured to detect a value of a battery output voltage and to disconnect an output of the battery from a load when the value of the battery output voltage reaches or falls below a first threshold; and a second protection circuit configured to detect the value of the battery output voltage and to disconnect the battery output from the load when the value of the battery output voltage reaches or falls below a second threshold, wherein the second protection circuit is disposed between the first protection circuit and the battery, such that the first protection circuit is disconnected from the battery when the voltage of the battery falls below the second threshold, and wherein the second threshold is higher than the first voltage value.

Embodiments may include one of the following features, or any combination thereof. The first threshold may be within a first range defined by a first tolerance, wherein the second threshold may be within a second range defined by a second tolerance, wherein the first range and the second range overlap. The first range may overlap a major portion of the second range. The battery may be a lithium ion battery. The first threshold and the second threshold may each be below 3.1 V.

In another aspect, a method of protecting a battery, may include the steps of: measuring, by a first protection circuit, a value of a battery output voltage; comparing the value of the battery output voltage to a first threshold; disconnecting a battery output from a load upon determining that the measured value of the battery output voltage is substantially equal to or lower than the first threshold; measuring, by a second protection circuit, the value of the battery output voltage; comparing the battery output voltage to a second threshold; and disconnecting the battery output from the load upon determining that the measured value of the battery output voltage is substantially equal to or lower than the second threshold, wherein the first threshold is substantially equal to the second threshold.

Embodiments may include one of the following features, or any combination thereof. The first threshold may be within a first range defined by a first tolerance, wherein the second threshold may be within a second range defined by a second tolerance, wherein an upper bound of the first range may be within a tenth of a volt of a lower bound of the second range. The first range and the second range may overlap. The first range may overlap a major portion of the second range. The first range and the second range may be coextensive. The first threshold and the second threshold may each be below 3.1 V.

Embodiments may include one of the following features, or any combination thereof. The second protection circuit may be disposed between the first protection circuit and the battery, such that the first protection circuit is disconnected from the battery when the value of the battery output voltage falls below the second threshold.

DETAILED DESCRIPTION

Certain types of batteries, such as lithium ion batteries, may not be discharged beyond a particular voltage referred to in this disclosure as the inhibit voltage. Discharging the battery beyond the inhibit voltage will result in steep decline of the life of the battery, and recharging the battery after it has been discharged beyond the inhibit voltage may be unsafe. Protection systems are often employed with batteries to disconnect the battery from the load before it reaches the inhibit voltage. However, protection systems employing two protection circuits continue to consume current at relatively high levels even after one protection circuit has disconnected the battery from the load. Thus, the battery may still reach the inhibit voltage relatively quickly even though it has been disconnected from the load. There is a need, therefore, in the art for a protection system that consumes current at a lower a rate.

Figure 1:
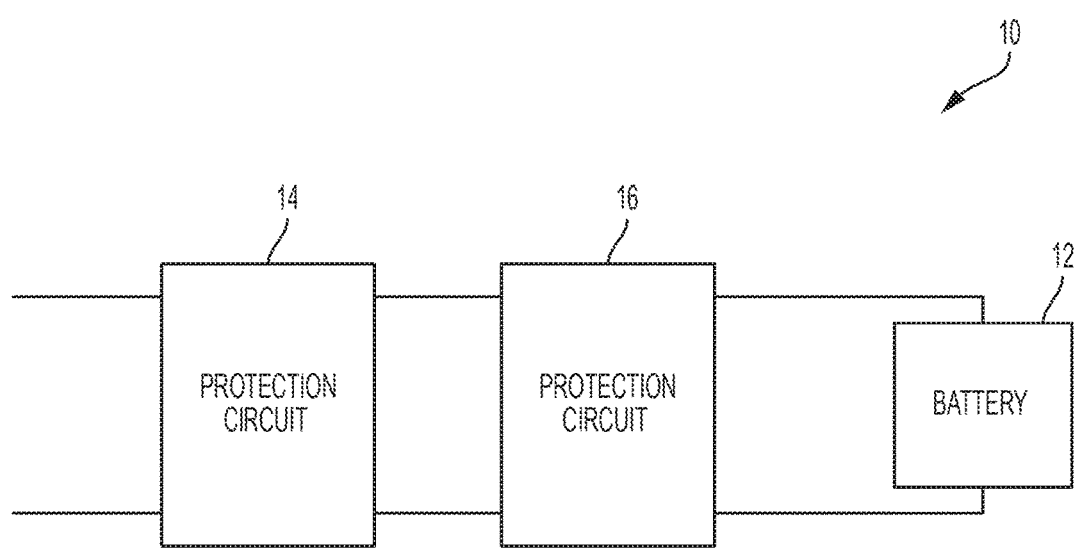
FIG. 1 is a schematic of an example system for battery protection.

FIG. 1 shows a schematic of a battery protection system 10 comprising a battery 12 a first protection circuit 14, and a second protection circuit 16. First protection circuit 14 and second protection circuit 16 are each disposed between battery 12 and a load (not shown) and are each configured to disconnect battery 12 from the load if the measured voltage of the battery cells drops below a predetermined value. The predetermined values, under which each of first protection circuit 14 and second protection circuit 16 enter the disconnect state, may be substantially equal.

Battery 12 may be any battery requiring management of an undervoltage condition—i.e., a voltage below which the battery cells must not fall. The undervoltage condition may, for example, occur when the voltage output of the battery falls below a level higher than the inhibit voltage $V_{inhibit}$. For the purposes of this disclosure, inhibit voltage $V_{inhibit}$ is the voltage above which the cell may be safely charged. This voltage is typically around 2.4 V per cell of the battery; however, for different types of batteries, this voltage may increase or decrease. Battery 12 may be any type of battery that exhibits such an inhibit voltage, such as a lithium-ion battery or a lead-acid battery. Battery 12 may include one or more cells. If battery 12 has more than one cell, a multiple protection system 10 (e.g., protection circuit 14 and protection circuit 16 of FIG. 1) may be employed, each respectively protecting one cell; however, in other embodiments, one protection system 10 may be employed for multiple cells.

In the example of FIG. 1, where a multiple protection system 10 is used, first protection circuit 14 and second protection circuit 16 are each configured to measure the output voltage of the battery $V_{out}$ and to compare that voltage against a predetermined threshold. As will be discussed below, these predetermined thresholds may be substantially equal. If the output voltage $V_{out}$ of battery 12 falls below the predetermined threshold, one or both of the protection circuits disconnect the battery from the load, so as to prevent further discharge of the cells as a result of connection to the load.

Figure 2:
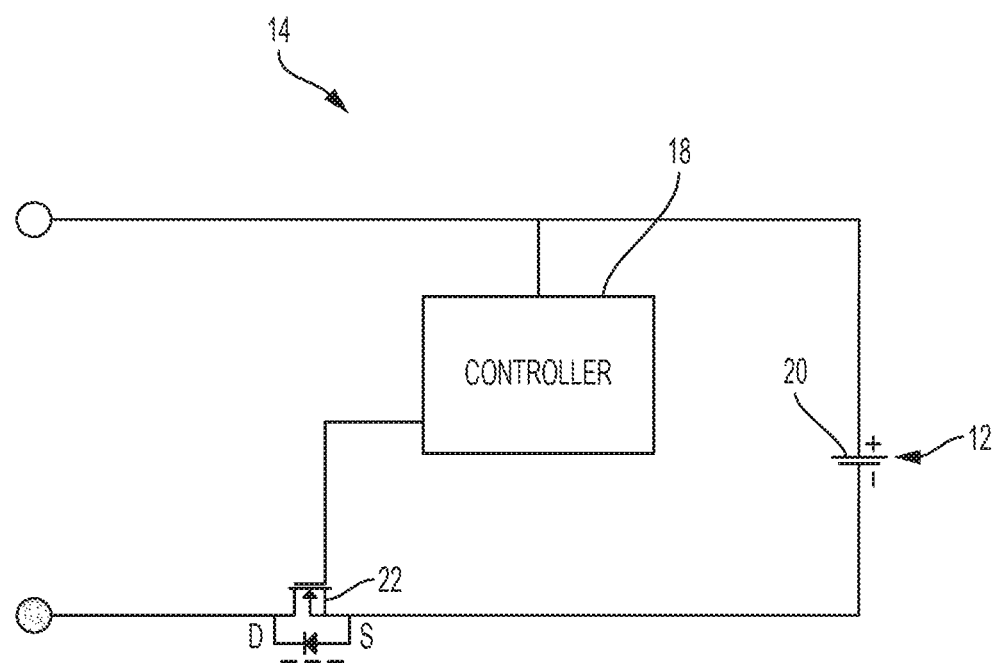
FIG. 2 is a schematic of an example undervoltage protection circuit.

FIG. 2 depicts a simplified schematic of a topology of an illustrative protection circuit. As shown, protection circuit 14 may be comprised of, for example, a controller 18 configured to measure the voltage at the input terminal 20 of the battery 12. Controller 18 may monitor the voltage at terminal 20, comparing it to a predetermined threshold (which may be the inhibit voltage or a voltage higher than the inhibit voltage). If the voltage at terminal 20 falls below the predetermined threshold, the battery is disconnected from the load. Disconnecting battery 12 from the load may be accomplished by, for example, a switch 22 disposed between the battery 12 and the protection circuit 15, which can be controlled to disconnect the battery from the load. The topology depicted in FIG. 2 is for the purpose of example only, and any other topology may be used. For example, switch 22 need not be external to controller 18, but rather be included as part of the integrated circuit of controller 18. In another example, controller 18 may be a comparator circuit configured to measure when the voltage output $V_{out}$ falls below a predetermined threshold.

Figure 3:
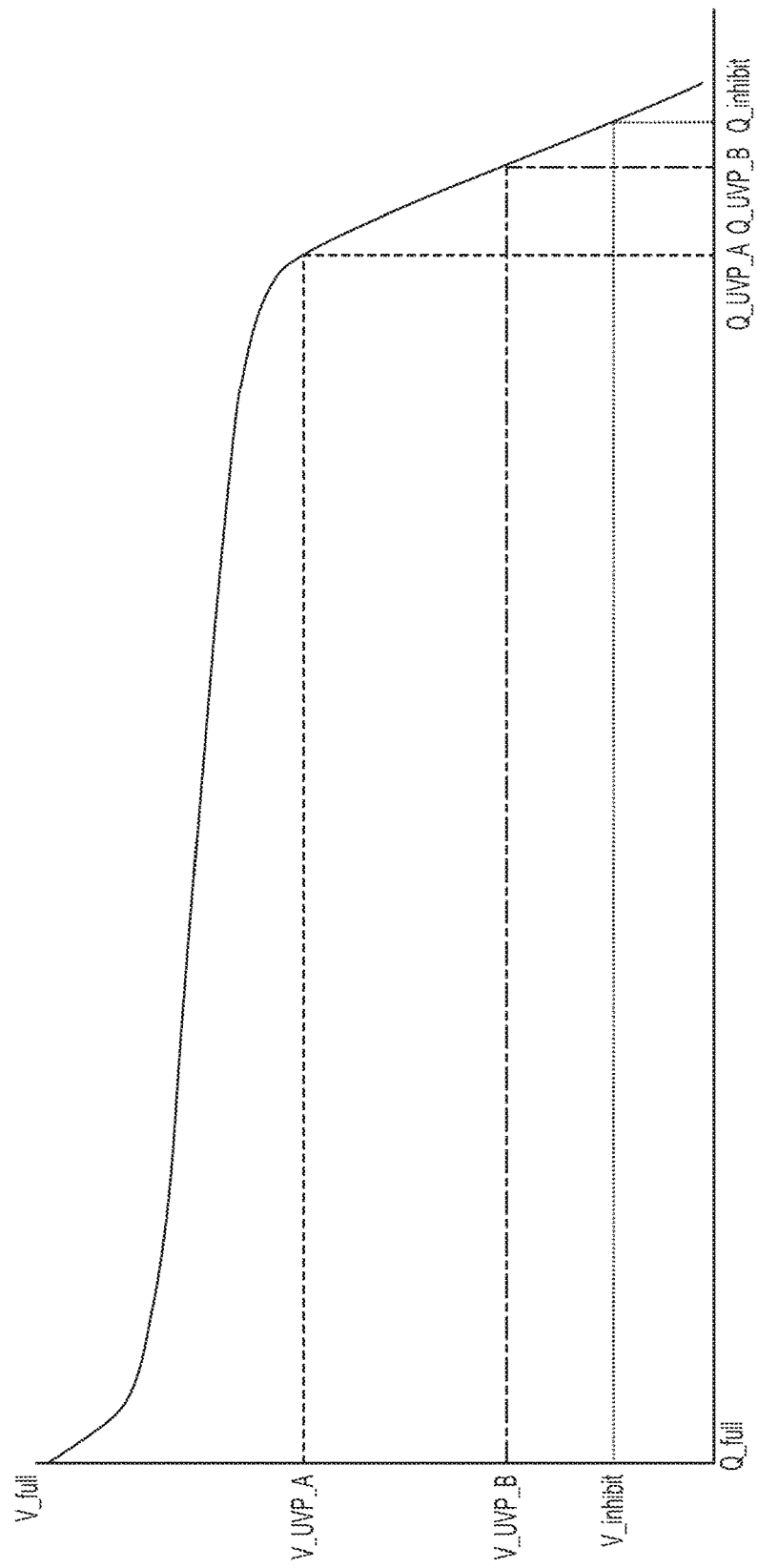
FIG. 3 is a graph of an example battery discharge curve.

FIG. 3 depicts a graph of an example battery discharge curve of battery 12. The x-axis of the graph denotes the charge of battery 12 ranging from $Q_{full}$ to $Q_{inhibit}$, while the y-axis denotes the voltage of the cell of battery 12 ranging from $V_{full}$ to $V_{inhibit}$, which correlates to a given charge. The values $Q_{inhibit}$ and $V_{inhibit}$ represent the minimum charge and voltage, respectively, over which the battery may be recharged safely.

Also marked on the graph of FIG. 3 are the relative protection voltages of the first protection circuit 14 and the second protection circuit 16, denoted as $V_{UVP\ A}$ and $V_{UVP\ B}$, respectively. The first protection threshold $V_{UVP\ A}$ and second protection threshold $V_{UVP\ B}$, respectively correlate with charges $Q_{UVP\ A}$ and $Q_{UVP\ B}$. First protection threshold $V_{UVP\ A}$, as shown on the graph in FIG. 3, is higher than $V_{UVP\ B}$.

Assuming the configuration of the protection circuits shown in FIG. 1, once the output voltage $V_{out}$ of battery 12 has fallen below first protection threshold $V_{UVP\ A}$, first protection circuit 14 will disconnect. However, since second protection threshold $V_{UVP\ B}$ is lower than first protection threshold $V_{UVP\ A}$, second protection circuit 16 will not disconnect, and will thus remain operational until voltage output $V_{out}$ reaches second protection threshold $V_{UVP\ B}$. Protection circuits consume a small amount of current, $I_{Leakage}$, when in the disconnect state, and a larger amount of current, $I_{Operation}$, when not in the disconnected state. Accordingly, when output voltage $V_{out}$ is between first protection threshold $V_{UVP\ A}$ and second protection threshold $V_{UVP\ B}$, first protection circuit 14 will consume current $I_{Leakage\ A}$ and second protection circuit 16 will consume $I_{Operation\ B}$. The charge of battery 12 will accordingly descend from $Q_{UVP\ A}$ to $Q_{UVP\ B}$ over a period of time, $t_{AB}$, defined by Eq. (1):

$$t_{AB} = \frac{Q_{UVPA} - Q_{UVPB}}{I_{Operation\ B} + I_{Leakage\ A}} \qquad \text{Eq. (1)}$$

Once the output voltage $V_{out}$ drops to second protection threshold, $V_{UVP\ B}$, first protection circuit 14 will cease consuming current because second protection circuit 16, disposed between first protection circuit 14 and battery 12 disconnects. This means that only second protection circuit 16 will consume current and battery 12 will lose charge at a lower rate defined by $I_{Leakage\ B}$. Indeed, the charge of battery 12 will descend from the charge at the threshold of second protection circuit 16, $Q_{UVP\ B}$, to the inhibit charge, $Q_{inhibit}$, over a period of time, $t_{Binh}$, defined by Eq. (2):

$$t_{Binh} = \frac{Q_{UVPB} - Q_{Inhibit}}{I_{Leakage\ B}} \qquad \text{Eq. (2)}$$

In this example, the shelf life of the battery—defined as the time, $t_{Ainh}$, that battery 12 may be left, without charging, once the charge of battery 12 has dropped to $Q_{UVP\ A}$ until the battery reaches inhibit charge $Q_{inhibit}$—may be written as the sum of Eq. (1) and Eq. (2):

$$t_{Ainh} = \frac{Q_{UVPA} - Q_{UVPB}}{I_{Operation\ B} + I_{Leakage\ A}} + \frac{Q_{UVPG} - Q_{Inhibit}}{I_{Leakage\ B}} \qquad \text{Eq. (3)}$$

The shelf life, stated more generally, is the time from the first protection circuit 14 or second protection circuit 16 disconnecting until the time that the voltage of the battery descends below the inhibit voltage $V_{inhibit}$ and thus may not be recharged safely.

Shelf life is diminished by allowing second protection circuit 16 to remain in operation (i.e., not in a disconnect state) during time $t_{AB}$, because second protection circuit 16 continues to unnecessarily draw current. Thus, to increase shelf life, the value of $Q_{UVP\ A}$ may be set relatively close to $Q_{UVP\ B}$, to minimize the time that protection circuits are simultaneously drawing current. To set $Q_{UVP\ A}$ close to $Q_{UVP\ B}$, first protection threshold $V_{UVP\ A}$ and second protection threshold $V_{UVP\ B}$ must be set relatively close. Indeed, the closer second protection threshold $V_{UVP\ B}$ is to first protection threshold $V_{UVP\ A}$, the greater the shelf life of battery 12 because the time that both protection circuits 14, 16 are consuming current is diminished.

Thus, the shelf life of the battery may be maximized by setting first protection threshold $V_{UVP\ A}$ and second protection threshold $V_{UVP\ B}$ to be substantially equal. In one example, substantially equal means that the threshold voltages are within a tenth of a volt from each other.

The threshold voltage of each protection circuit 14 and 16 may only be set as close as the tolerances of the protection circuits 14, 16, as determined by a manufacturer, will allow. In one respect, the tolerances define a range of values in which the threshold voltage may fall. For example, if first protection circuit 14 has a first protection threshold of 3.1 V and a tolerance of ±0.1 V and second protection circuit 16 has a second protection threshold of 2.9 V and a tolerance of ±0.1 V, once manufactured, first protection circuit may have a threshold of 3.0 V while second protection circuit also has a second protection threshold of 3.0 V, due to the tolerances. Therefore, in this example, due to the tolerances, first protection threshold $V_{UVP\_A}$ and second protection threshold $V_{UVP\_B}$ are substantially equal. Thus, any two protection circuits may have substantially equal protection voltages if the upper bound of the lower threshold range of voltages is within a tenth of a volt of the lower bound of the upper threshold range of voltages (the bounds of each threshold being defined by the respective tolerances associated with each). For example, if first protection threshold $V_{UVP\_A}$ is set to 2.8 volts and second protection threshold $V_{UVP\_B}$ is set to 3.1 volts, and each have a tolerance of ±0.1 V, the first protection threshold $V_{UVP\_A}$ and second protection threshold $V_{UVP\_B}$ will be substantially equal because the upper bound of $V_{UVP\_A}$ (2.9 V) is within a tenth of a volt of the lower bound of second protection threshold $V_{UVP\_B}$ (3.0 V).

In an embodiment, the threshold voltages of first protection circuit 14 and second protection circuit 16 may be set such that the ranges of potential threshold voltages of each circuit, as defined by their respective tolerances, overlap. In another embodiment, the range of threshold voltages of one of first protection circuit 14 or second protection circuit 16 may overlap with a majority of the range of another. For example, if first protection circuit 14 has a first protection threshold of 3.0 V and second protection circuit 16 has a second protection threshold of 2.95 V, each having a tolerance of ±0.1 V, then the value of the first protection threshold may fall within the range of 2.9-3.1 V, while the second protection threshold may fall within the range of 2.85-3.05 V. These ranges thus overlap with major portions of each other. Indeed, if the protection circuits have the same tolerances, then the range of each protection circuit will overlap with a majority of the range of the other protection circuit.

In yet another embodiment, the range of tolerances may be coextensive. This will occur if both protection circuits have the same tolerances and the thresholds are set to be equal to one another. For example, the first protection threshold may be set to 3.1 V and second protection may also be set to 3.1 V. If both protection circuits have the same tolerances, then the ranges of each of first protection circuit 14 and second protection circuit 16 will be coextensive.

In an embodiment, the threshold of the second protection circuit 16 may be set higher than the threshold of the first protection circuit 14. Because second protection circuit 16 is disposed between first protection circuit 14 and battery 12 this will ensure that, as long as both protection circuits are functioning properly, first protection circuit 14 will be disconnected from the battery after the second protection circuit 16 enters the disconnect state, such that first protection circuit 14 ceases to consume current. Thus, at no point in time will one protection circuit continue to drain current from battery 12 while the other protection circuit is disconnected.

Because the ranges are set relatively close, thus extending the shelf life of the battery, the thresholds of each protection circuit may be set at a lower voltage to extend the operating time of the battery, while still maintaining a high shelf life. For example, if, in the example of FIG. 1, first protection threshold $V_{UVP\_A}$ (corresponding to protection circuit 16) was set to 3.5 V, and second protection threshold $V_{UVP\_B}$ was set to 2.7 V (corresponding to protection circuit 14), this will yield a shelf life that is diminished because of the gap between first protection threshold $V_{UVP\_A}$ and second protection threshold $V_{UVP\_B}$. Setting second protection threshold $V_{UVP\_B}$ substantially equal to first protection threshold $V_{UVP\_A}$ will increase the shelf life because both protection circuits are operating for a diminished period of time. As a result, the first protection threshold $V_{UVP\_A}$ and second protection threshold $V_{UVP\_B}$ may each be set lower to increase the operating time of battery 12 while still maintaining the original shelf life. For example, both first protection threshold $V_{UVP\_A}$ and $V_{UVP\_B}$ may be set to less than or equal to 3.1 V while still maintaining shelf life.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the inventive scope of the present disclosure.

What is claimed is:

1. A battery protection system, comprising:
   a first protection circuit configured to detect a value of a battery output voltage and to disconnect an output of the battery from a load when the value of the battery output voltage reaches or falls below a first threshold; and
   a second protection circuit, disposed in series with the first protection circuit, configured to detect the value of the battery output voltage and to disconnect the battery output from the load when the value of the battery output voltage reaches or falls below a second threshold, wherein the first threshold is substantially equal to the second threshold, wherein the first threshold is within a first range defined by a first tolerance, wherein the second threshold is within a second range defined by a second tolerance, wherein an upper bound of the first range is within a tenth of a volt of a lower bound of the second range.

2. The battery protection system of claim 1, wherein the first range and the second range overlap.

3. The battery protection system of claim 2, wherein the first range overlaps a major portion of the second range.

4. The battery protection system of claim 2, wherein the first range and the second range are substantially coextensive.

5. The battery protection system of claim 1, wherein the second protection circuit is disposed between the first protection circuit and the battery, such that the first protection circuit is disconnected from the battery when the value of the battery output voltage falls below the second threshold.

6. The battery protection system of claim 5, wherein the second threshold is higher than the first threshold.

7. The battery protection system of claim 1, the first threshold and the second threshold are each below 3.1 V.

8. A battery protection system, comprising:
a first protection circuit configured to detect a value of a battery output voltage and to disconnect an output of the battery from a load when the value of the battery output voltage reaches or falls below a first threshold; and
a second protection circuit configured to detect the value of the battery output voltage and to disconnect the battery output from the load when the value of the battery output voltage reaches or falls below a second threshold, wherein the second protection circuit is disposed between the first protection circuit and the battery, such that the first protection circuit is disconnected from the battery when the voltage of the battery falls below the second threshold, and wherein the second threshold is higher than the first threshold.

9. The battery protection system of claim 8, wherein the first threshold is within a first range defined by a first tolerance, wherein the second threshold is within a second range defined by a second tolerance, wherein the first range and the second range overlap.

10. The battery protection system of claim 9, wherein the first range overlaps a major portion of the second range.

11. The battery protection system of claim 9, wherein the battery is a lithium ion battery.

12. The battery protection system of claim 8, wherein the first threshold and the second threshold are each below 3.1 V.

13. A method of protecting a battery, comprising the steps of:
measuring, by a first protection circuit, a value of a battery output voltage;
comparing the value of the battery output voltage to a first threshold;
disconnecting a battery output from a load upon determining that the measured value of the battery output voltage is substantially equal to or lower than the first threshold;
measuring, by a second protection circuit, the value of the battery output voltage;
comparing the battery output voltage to a second threshold, wherein the first threshold is within a first range defined by a first tolerance, wherein the second threshold is within a second range defined by a second tolerance, wherein an upper bound of the first range is within a tenth of a volt of a lower bound of the second range; and
disconnecting the battery output from the load upon determining that the measured value of the battery output voltage is substantially equal to or lower than the second threshold, wherein the first threshold is substantially equal to the second threshold.

14. The method of claim 13, wherein the first range and the second range overlap.

15. The method of claim 14, wherein the first range overlaps a major portion of the second range.

16. The method of claim 14, wherein the first range and the second range are substantially coextensive.

17. The method of claim 13, wherein the second protection circuit is disposed between the first protection circuit and the battery, such that the first protection circuit is disconnected from the battery when the value of the battery output voltage falls below the second threshold.

18. The method of claim 13, wherein the first threshold and the second threshold are each below 3.1 V.

\* \* \* \* \*